US012803810B2

(12) United States Patent
Cho et al.

(10) Patent No.: US 12,803,810 B2
(45) Date of Patent: Nov. 17, 2026

(54) APPARATUS AND METHOD FOR PASSWORD-BASED DISTRIBUTED AUTHENTICATION

(71) Applicant: Electronics and Telecommunications Research Institute, Daejeon (KR)

(72) Inventors: Kwan-Tae Cho, Daejeon (KR); Sang-Rae Cho, Chungcheongbuk-do (KR); Soo-Hyung Kim, Sejong-si (KR); Seok-Hyun Kim, Daejeon (KR); Young-Sam Kim, Daejeon (KR); Jong-Hyouk Noh, Daejeon (KR); Young-Seob Cho, Daejeon (KR); Jin-Man Cho, Daejeon (KR); Seung-Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 4 days.

(21) Appl. No.: 18/799,662

(22) Filed: Aug. 9, 2024

(65) Prior Publication Data

US 2025/0219836 A1 Jul. 3, 2025

(30) Foreign Application Priority Data

Dec. 27, 2023 (KR) ........................ 10-2023-0192554

(51) Int. Cl.
*H04L 9/32* (2006.01)
*H04L 9/08* (2006.01)

(52) U.S. Cl.
CPC .......... *H04L 9/3226* (2013.01); *H04L 9/0863* (2013.01); *H04L 9/3213* (2013.01)

(58) Field of Classification Search
CPC .... H04L 9/0863; H04L 9/3213; H04L 9/3226
See application file for complete search history.

(56) References Cited

U.S. PATENT DOCUMENTS 9,929,860 B1 * 3/2018 Triandopoulos ...... H04L 9/0863
11,115,196 B1 * 9/2021 Triandopoulos ...... H04L 63/083
(Continued)

FOREIGN PATENT DOCUMENTS

AU 2020286254 A1 * 1/2021
CN 112003690 A * 11/2020 ............. H04L 63/06
(Continued)

OTHER PUBLICATIONS

Bissoli, Andrea, and Fabrizio d'Amore. "Authentication as a service: Shamir Secret Sharing with byzantine components." arXiv preprint arXiv:1806.07291 (2018). (Year: 2018).*
(Continued)

*Primary Examiner* — Michael Simitoski
(74) *Attorney, Agent, or Firm* — Sughrue Mion, PLLC

(57) ABSTRACT

Disclosed herein is an apparatus and method for password-based distributed authentication. The apparatus includes memory in which at least one program is recorded and a processor for executing the program. The program may perform at least one of registering a password input by a user in a service membership sign-up procedure in multiple servers in a distributed manner based on multi-party computation, authenticating a password input by the user in a login procedure based on multi-party computation with the multiple servers, or acquiring resources of a service requested by the authenticated user, or a combination thereof.

10 Claims, 6 Drawing Sheets

(56) References Cited

U.S. PATENT DOCUMENTS

| | | | | |
|---|---|---|---|---|
| 11,336,428 | B1 | 5/2022 | Resch et al. | |
| 2003/0221102 | A1* | 11/2003 | Jakobsson | H04L 9/0844 713/171 |
| 2004/0030932 | A1* | 2/2004 | Juels | H04L 9/0844 713/168 |
| 2006/0085862 | A1* | 4/2006 | Witt | H04L 65/612 726/28 |
| 2015/0295930 | A1* | 10/2015 | Dixon | H04L 63/0807 713/181 |
| 2015/0341173 | A1* | 11/2015 | Camenisch | H04L 63/0876 713/183 |
| 2015/0349958 | A1* | 12/2015 | Lindell | G06F 21/31 713/168 |
| 2016/0094540 | A1* | 3/2016 | Camenisch | H04L 9/085 726/8 |
| 2016/0197906 | A1* | 7/2016 | Kikuchi | H04L 9/3226 713/168 |
| 2016/0330018 | A1* | 11/2016 | Miyata | H04L 9/3226 |
| 2017/0104745 | A1* | 4/2017 | Camenisch | H04L 9/085 |
| 2017/0155634 | A1* | 6/2017 | Camenisch | H04L 9/085 |
| 2019/0116180 | A1* | 4/2019 | Teranishi | G06F 21/32 |
| 2020/0145215 | A1* | 5/2020 | McMahon | H04L 9/0894 |
| 2021/0194874 | A1* | 6/2021 | Herder, III | G06N 3/04 |
| 2021/0243026 | A1* | 8/2021 | Mohassel | H04L 9/085 |
| 2022/0014354 | A1* | 1/2022 | Valladolid | H04L 9/3271 |
| 2022/0150066 | A1* | 5/2022 | Sugarev | H04L 9/3213 |
| 2022/0173901 | A1* | 6/2022 | Garcia Valenzuela | H04L 63/0823 |
| 2022/0261466 | A1* | 8/2022 | Gelardi | H04L 9/085 |
| 2023/0050481 | A1* | 2/2023 | Nagaraja | H04L 9/0897 |
| 2023/0066582 | A1* | 3/2023 | Le Van Gong | H04L 9/50 |
| 2023/0120202 | A1* | 4/2023 | Yanai | H04L 9/3006 380/277 |
| 2023/0179406 | A1* | 6/2023 | Yanai | H04L 9/0869 380/44 |

FOREIGN PATENT DOCUMENTS

| | | | | | |
|---|---|---|---|---|---|
| CN | 114640440 | A | * | 6/2022 | H04L 9/0869 |
| GB | 2541586 | A | * | 2/2017 | G06F 21/31 |
| KR | 10-1654306 | B1 | | 9/2016 | |
| KR | 10-2023-0094253 | A | | 6/2023 | |
| KR | 10-2568656 | A | | 8/2023 | |
| TW | I759138 | B | * | 3/2022 | |
| WO | WO-2021222272 | A1 | * | 11/2021 | H04L 9/085 |

OTHER PUBLICATIONS

Falamas, Diana-Elena, Kinga Marton, and Alin Suciu. "Assessment of two privacy preserving authentication methods using secure multiparty computation based on secret sharing." Symmetry 13.5 (2021): 894. (Year: 2021).*

M. Guan, J. Song and W. Liu, "A Threshold Multi-server Protocol for Password-Based Authentication, " 2016 IEEE 3rd International Conference on Cyber Security and Cloud Computing (CSCloud), Beijing, China, 2016, pp. 108-118, doi: 10.1109/CSCloud.2016.26. (Year: 2016).*

Kikuchi, Ryo, et al. "Password-based authentication protocol for secret-sharing-based multiparty computation." IEICE Transactions on Fundamentals of Electronics, Communications and Computer Sciences 101.1 (2018): 51-63. (Year: 2018).*

S. Tan, W. Chen, R. Deng and R. A. Popa, "MPCAuth: Multi-factor Authentication for Distributed-trust Systems, " 2023 IEEE Symposium on Security and Privacy (SP), San Francisco, CA, USA, 2023, pp. 829-847, doi: 10.1109/SP46215.2023.10179481. (Year: 2023).*

Chuang, Chih Yun et al. TW 1759138 B (machine translation), published Mar. 21, 2022. (Year: 2022).*

* cited by examiner

APPARATUS AND METHOD FOR PASSWORD-BASED DISTRIBUTED AUTHENTICATION

CROSS REFERENCE TO RELATED APPLICATION

This application claims the benefit of Korean Patent Application No. 10-2023-0192554, filed Dec. 27, 2023, which is hereby incorporated by reference in its entirety into this application.

BACKGROUND OF THE INVENTION

1. Technical Field

The disclosed embodiment relates to password-based authentication technology.

2. Description of the Related Art

In online services, various methods are used in order to verify the identity of users, and passwords are still the most commonly used means of user authentication.

A password method is a means of user authentication in which a user ID and a password, which is secret information corresponding to the user ID, are stored in a server and when a user logs in, whether the user is a valid user is determined by checking whether the password input by the user matches the password stored in the server. The password method is the oldest user authentication means, and is still provided as the primary means of user authentication in most online services.

In addition to the password method, PIN numbers, public certificates, biometric recognition technology, such as fingerprints, an iris, and the like, are used as the means of user authentication, but these are used as a supplementary or auxiliary authentication means in addition to passwords in order to enhance security and convenience.

User passwords used in the password authentication method are typically stored and managed in a single server or secure repository of a service provider. In other words, if a malicious attacker successfully hacks the password of a user (a service subscriber), the password of the user is exposed to the attacker, which may lead to the leakage of more personal information of the user and an invasion of privacy. When the exposed password is not that of a regular user but an administrator password for the service provider's server, the damage becomes more severe, which leads to massive leakage of personal information of all service subscribers, legal sanctions, shutdown of the corresponding service, mass exodus of service subscribers, etc., and substantial loss such as a decrease in trust of the service provider is caused.

As a conventional countermeasure against hacking attacks on user credentials (information used for authenticating users, such as passwords or biometric information), there is a method of dividing user credentials and storing the same in multiple repositories rather than a single repository. However, because this method simply divides the user credentials physically, if any one of the multiple repositories is hacked into, portions of the user credentials are exposed to an attacker, and the attacker may more easily infer or obtain the original user credentials by exploiting the exposed credential information.

SUMMARY OF THE INVENTION

An object of the disclosed embodiment is to securely register the password of a user in multiple servers in a distributed manner.

Another object of the disclosed embodiment is to enable user authentication without exposing password verification fragment values stored in a distributed manner.

A further object of the disclosed embodiment is to issue and manage a token without a trusted third-party organization (a trusted server).

Yet another object of the disclosed embodiment is to make it easy to apply the means of user authentication using various credentials that can be digitally expressed, such as biometric information including fingerprints, an iris, etc., in addition to passwords.

An apparatus for password-based distributed authentication according to an embodiment includes memory in which at least one program is recorded and a processor for executing the program. The program may perform at least one of registering a password input by a user in a service membership sign-up procedure in multiple servers in a distributed manner based on multi-party computation, authenticating a password input by the user in a login procedure based on multi-party computation with the multiple servers, or acquiring a resource of a service requested by the authenticated user, or a combination thereof.

Here, when registering the password, the program may perform receiving an identifier and the password from the user who requests signing up for a membership, converting the received password into a password verification value, generating a secret-sharing polynomial using the password verification value, generating multiple password verification fragment values using the secret-sharing polynomial and IDs of the multiple servers, and distributing the password verification fragment values to corresponding ones of the multiple servers.

Here, converting the received password may comprise converting the received password into the password verification value using a salt or a hash.

Here, generating the secret-sharing polynomial may comprise generating the secret-sharing polynomial using a Shamir's secret sharing method.

Here, when authenticating the password, the program may perform generating a token generation key when an identifier and the password are input by the user, converting the password input by the user into a password verification value, restoring a password verification comparison value, checking whether the restored password verification comparison value matches the password verification value, generating a token key and a token based on the token generation key when the password verification comparison value matches the password verification value, and storing the generated token.

Here, when restoring the password verification comparison value, the program may restore the password verification comparison value based on password verification fragment values of t servers, among N servers across which the password verification fragment values are distributed, and the password verification comparison value may be calculated as the sum of Lagrange basis polynomials multiplied by the respective password verification fragment values.

Here, the token may include a token signature and token data.

Here, the token data may include at least one of a user identifier, a token serial number, service access authority information, a token issuance date and time, or a token expiration date and time, or a combination thereof.

Here, the token key may be generated based on the sum of token generation keys initially generated by a user terminal and t servers.

Here, when acquiring the resource, the program may perform retrieving whether a token for the requested service is present, transferring the retrieved token to a server providing the requested service, and receiving the resource from the server when the token is verified.

An apparatus for password-based distributed authentication according to an embodiment includes memory in which at least one program is recorded and a processor for executing the program. The program may perform at least one of registering password verification fragment values generated through multi-party computation with one or more additional servers based on a password input by a user through a user terminal in a service membership sign-up procedure, authenticating a password input by the user in a login procedure based on multi-party computation using the password verification fragment values registered in the one or more additional servers in a distributed manner, or providing a resource of a service requested from the user terminal based on token verification, or a combination thereof.

Here, when authenticating the password, the program may perform reading the password verification fragment values corresponding to an identifier of the user and generating a token generation key, converting the password input by the user into a password verification value, restoring a password verification comparison value from the password verification fragment values registered in a distributed manner through multi-party computation with the one or more additional servers, checking whether the restored password verification comparison value matches the password verification value, generating a token key and a token based on the token generation key when the password verification comparison value matches the password verification value, and storing the generated token key.

Here, the token key may be generated based on the sum of token generation keys initially generated by the user terminal and t servers.

Here, when providing the resource, the program may perform receiving a service request and a token from the user terminal, retrieving a token key corresponding to the token, verifying the token using the retrieved token key, and providing the resource when the token is verified.

Here, when verifying the token, the program may perform generating a token signature using the retrieved token key and token data included in the token and checking whether the generated token signature matches a token signature included in the token.

A method for password-based distributed authentication according to an embodiment may include receiving an identifier and a password from a user who requests signing up for a membership, converting the received password into a password verification value, generating a secret-sharing polynomial using the password verification value, generating multiple password verification fragment values using the secret-sharing polynomial and the IDs of multiple servers, and distributing the password verification fragment values to corresponding ones of the multiple servers.

Here, the method for password-based distributed authentication according to an embodiment may further include generating a token generation key when an identifier and a password are input by the user, converting the password input by the user into a password verification value, restoring a password verification comparison value, checking whether the restored password verification comparison value matches the password verification value, generating a token key and a token based on the token generation key when the password verification comparison value matches the password verification value, and storing the generated token.

Here, restoring the password verification comparison value may comprise restoring the password verification comparison value based on password verification fragment values of t servers, among N servers across which the password verification fragment values are distributed, and the password verification comparison value may be calculated as the sum of Lagrange basis polynomials multiplied by the respective password verification fragment values.

Here, the token key may be generated based on the sum of token generation keys initially generated by a user terminal and the t servers.

Here, the method for password-based distributed authentication according to an embodiment may further include acquiring a resource of a service requested by the user, and acquiring the resource may include retrieving whether a token for the requested service is present, transferring the retrieved token to a server providing the requested service, and receiving the resource from the server when the token is verified. The token may include a token signature and token data, and may be verified depending on whether the token signature included in the transferred token matches a token signature generated by the server using a token key and the token data.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
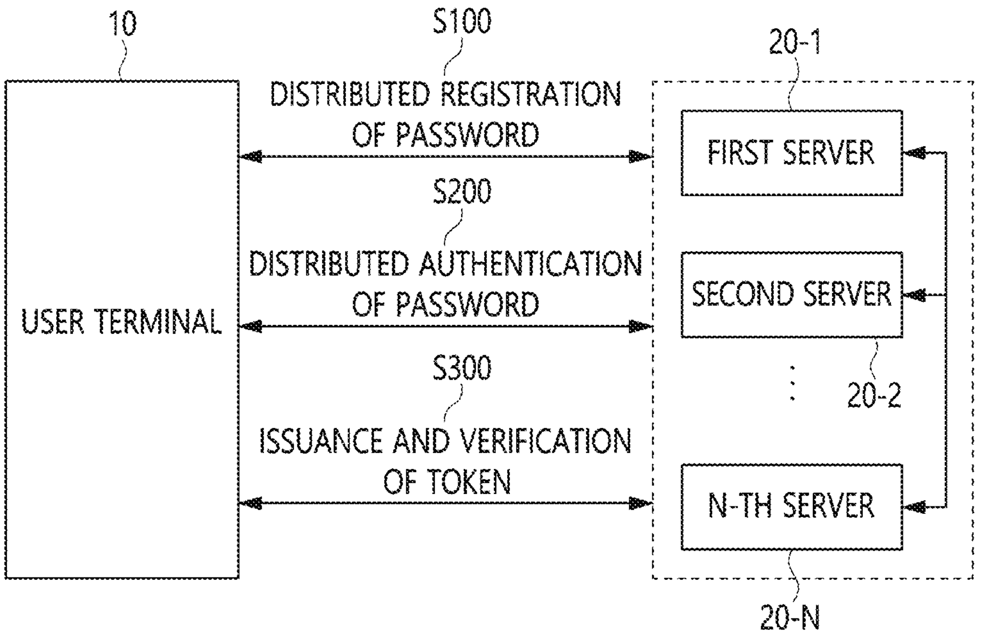
FIG. 1 is a schematic block diagram of a system for password-based distributed authentication according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms “first,” “second,” etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms “comprises,” “comprising,”, “includes” and/or “including,” when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

FIG. 1 is a schematic block diagram of a system for password-based distributed authentication according to an embodiment.

Referring to FIG. 1, the system for password-based distributed authentication according to an embodiment may include a user terminal 10 and multiple servers 20-1, 20-2, . . . , 20-N.

Here, through the user terminal 10, a user may sign up for a service that a service provider provides through the multiple servers 20-1, 20-2, . . . , 20-N.

Here, the multiple servers 20-1, 20-2, . . . , 20-N may be operated by a single service provider or multiple service providers. Also, according to an embodiment, the multiple servers 20-1, 20-2, . . . , 20-N may perform Multi-Party Computation (MPC) through mutual communication.

According to an embodiment, the user terminal 10 and the multiple servers 20-1, 20-2, . . . , 20-N may perform a process of registering the password, which is input by the user in the service membership sign-up procedure, in the multiple servers 20-1, 20-2, . . . , 20-N in a distributed manner based on multi-party computation at step S100. This will be described in detail later in with reference to FIG. 2 and FIG. 3.

In the conventional user authentication technology, there is an invention in which a biometric information verification value (a cryptographically secure value derived from a biometric information value using a one-way hash function, or the like), which is one of pieces of user credential information, is simply divided into segments and the segments are mixed and stored in a distributed manner, but when servers or repositories in which the segments are stored in a distributed manner are hacked into, part of the user’s biometric information verification value may be exposed.

However, in an embodiment, rather than simply dividing a password hash value (referred to as a password verification value hereinbelow), cryptographically randomized values (referred to as password verification fragment values hereinbelow) using multi-party computation are stored in a distributed manner, so an attacker is not able to obtain even one bit of information about the user’s password verification value unless the attacker hacks into more than a certain number of servers or repositories across which the password verification fragment values are distributed. Also, when the user is authenticated, the password verification value is verified through multi-party computation of the random values stored in a distributed manner, so each of the servers or repositories cannot obtain the password verification value.

Also, according to an embodiment, a process of authenticating the password input by the user in a login procedure based on multi-party computation with multiple servers may be performed at step S200 based on multi-party computation between the user terminal 10 and two or more of the multiple servers 20-1, 20-2, . . . , 20-N.

That is, it is checked whether the password input through the user terminal 10 for user login matches the password that was registered in two or more of the multiple servers 20-1, 20-2, . . . , 20-N in a distributed manner when the user signed up.

When user authentication succeeds, a token is generated based on multi-party computation between the user terminal 10 and two or more of the multiple servers 20-1, 20-2, . . . , 20-N without a separate trusted server and is then issued to the user terminal 10, and simultaneously, a token key used for verification of the token is transmitted to the two or more of the multiple servers 20-1, 20-2, . . . , 20-N, which participated in generation of the token. This will be described in detail later with reference to FIG. 4 and FIG. 5.

That is, according to an embodiment, multi-party computation technology may be used not only for user login but also for issuance of a token for user authentication.

Generally, a token authentication method is used as one of means of maintaining authentication after user login for the user convenience, in which case a separate trusted server (Trusted Third Party (TTP)) for issuing a token is required. This incurs additional service administrative costs borne by the service provider, and may cause the problem of a Single Point Of Failure (SPOF).

In contrast, when password authentication is performed based on multi-party computation as in the embodiment, a token may be securely issued through multi-party computation between multiple service provider’s servers without a separate trusted server.

Finally, according to an embodiment, the resources of the service requested by the authenticated user are acquired based on multi-party computation between the user terminal 10 and two or more of the multiple servers 20-1, 20-2, . . . , 20-N.

That is, the user terminal 10 transfers the token to the server that provides the service requested by the user. Accordingly, the server verifies the token using the token key acquired at the time of user login, and depending on the verification result, the server provides the service desired by the user to the user terminal 10 within resources allowed by the token to the user. This will be described in detail later with reference to FIG. 6.

Figure 2:
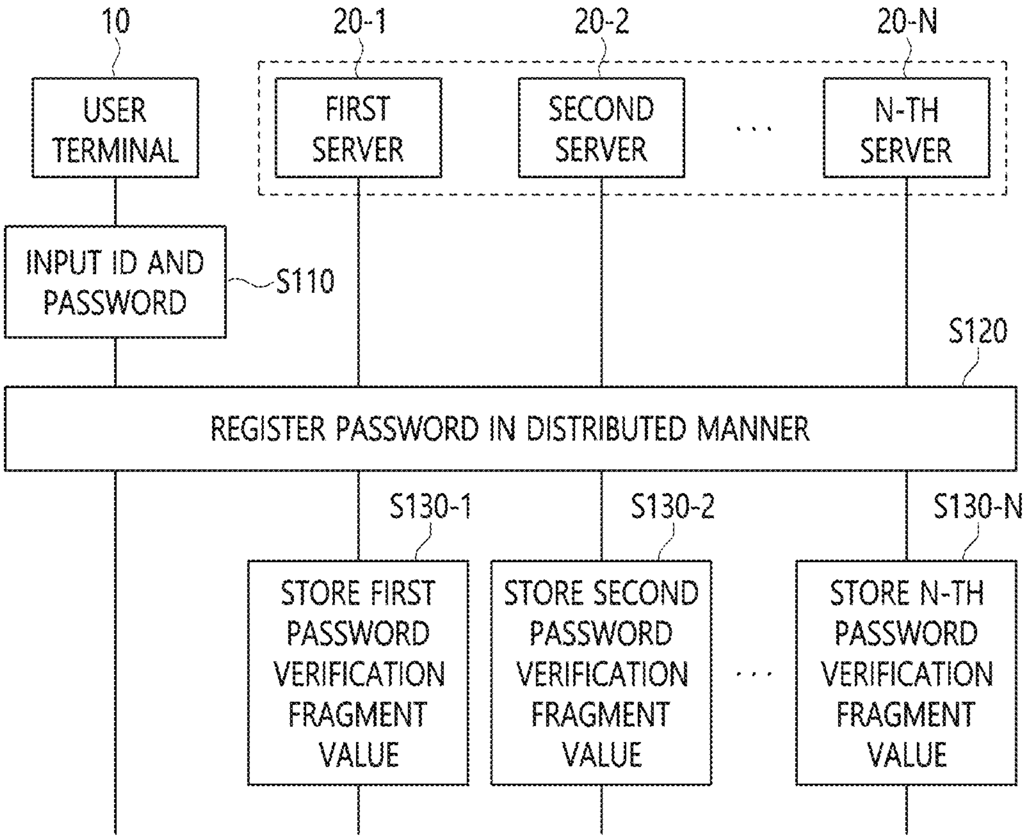
FIG. 2 is a signal flowchart for explaining a process of distributed registration of a password according to an embodiment.
Figure 3:
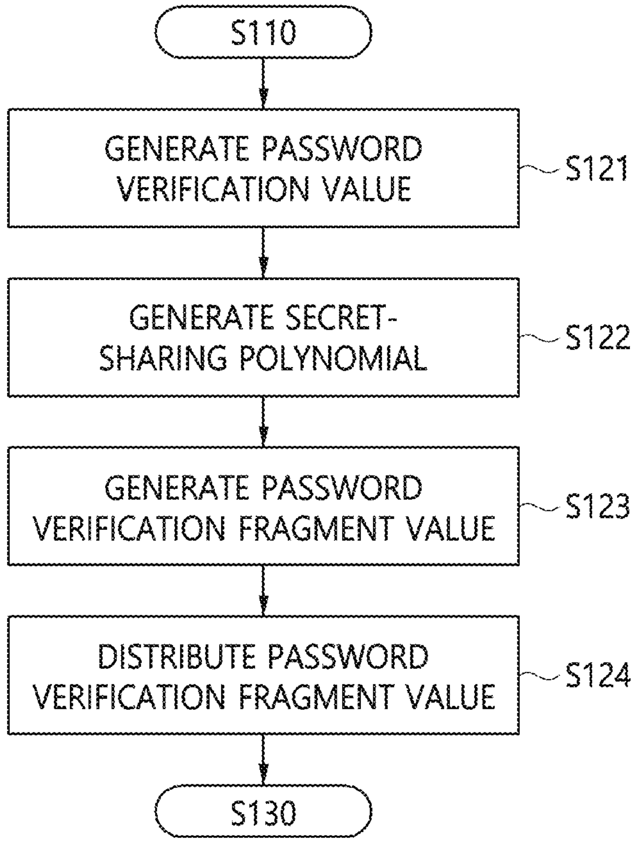
FIG. 3 is a flowchart for explaining a multi-party computation step for distributed registration of a password according to an embodiment.

FIG. 2 is a signal flowchart for explaining a process of distributed registration of a password according to an embodiment, and FIG. 3 is a flowchart for explaining a multi-party computation step for password distribution according to an embodiment.

Referring to FIG. 2, a user terminal 10 receives a user ID and a password from a user at step S110.

Subsequently, distributed registration of the input password may be performed at step S120 through multi-party computation between the user terminal 10 and N servers 20-1, 20-2, . . . , 20-N.

Specifically, referring to FIG. 3, the user terminal 10 converts the password input by the user into a password verification value hpw at step S121.

Here, the password may be converted into the password verification value using a salt, a hash, or the like.

Subsequently, the user terminal 10 generates a secret-sharing polynomial using the password verification value at S122.

Here, using a Shamir's secret sharing technique, a secret-sharing polynomial like Equation (1) below may be generated for distributed storage in the N servers 20-1, 20-2, . . . , 20-N.

$$F_{hpw}(x) = c_{t-1}x^{t-1} + c_{t-2}x^{t-2} + \dots\ c_1x + hpw \quad (1)$$

In Equation (1), c; is the coefficient of an x term of degree i ($1 \le i \le t-1$, $t < N$). When the (t−1)-th degree polynomial is used, the password verification value hpw may be restored using Lagrange interpolation by participation of t or more of the N servers 20-1, 20-2, . . . , 20-N.

Subsequently, the user terminal 10 acquires the respective IDs of the multiple servers 20-1, 20-2, . . . , 20-N and generates multiple password verification fragment values using the calculated secret-sharing polynomial $F_{hpw}(x)$ and the respective IDs of the multiple servers 20-1, 20-2, . . . , 20-N at step S123.

For example, the user terminal 10 may calculate $hpw_1 = F_{hpw}(1)$ as the first password verification fragment value for the first server 20-1, may calculate $hpw_2 = F_{hpw}(2)$ as the second password verification fragment value for the second server 20-2, and may calculate $hpw_N = F_{hpw}(N)$ as the N-th password verification fragment value for the N-th server 20-N.

The user terminal 10 distributes the password verification fragment values to the corresponding ones of the multiple servers 20-1, 20-2, . . . , 20-N at step S124.

For example, $hpw_1$ may be transmitted to the first server 20-1, $hpw_2$ may be transmitted to the second server 20-2, and $hpw_N$ may be transmitted to the N-th server 20-N.

Subsequently, the N servers 20-1, 20-2, . . . 20-N each securely store the password verification fragment values, which are distributed after multi-party computation performed at S120, in the repositories thereof at step S130.

For example, the first server 20-1 may store the first password verification fragment value $hpw_1$ distributed thereto at step S130-1, the second server 20-2 may store the second password verification fragment value $hpw_2$ distributed thereto at step S130-2, and the N-th server 20-N may store the N-th password verification fragment value $hpw_N$ distributed thereto at step S130-N.

Figure 4:
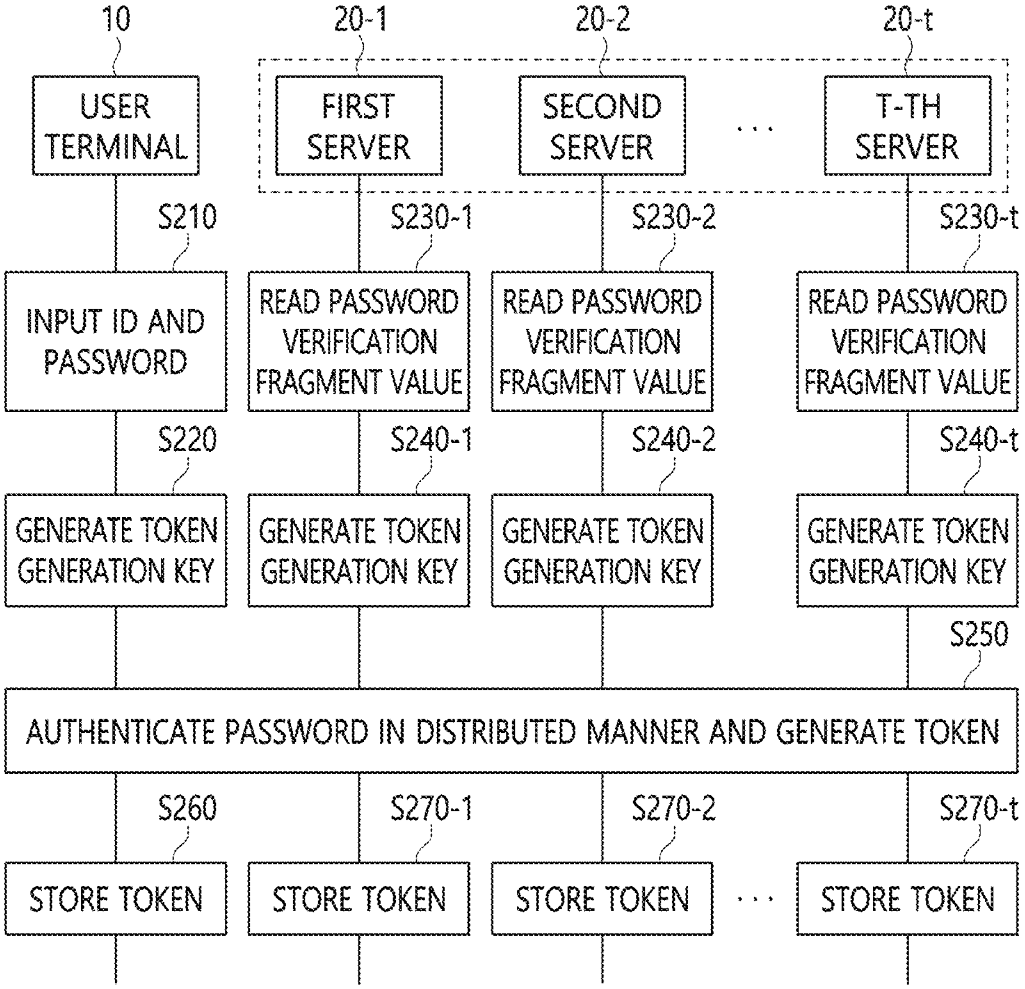
FIG. 4 is a signal flowchart for explaining a process of distributed authentication of a password according to an embodiment.
Figure 5:
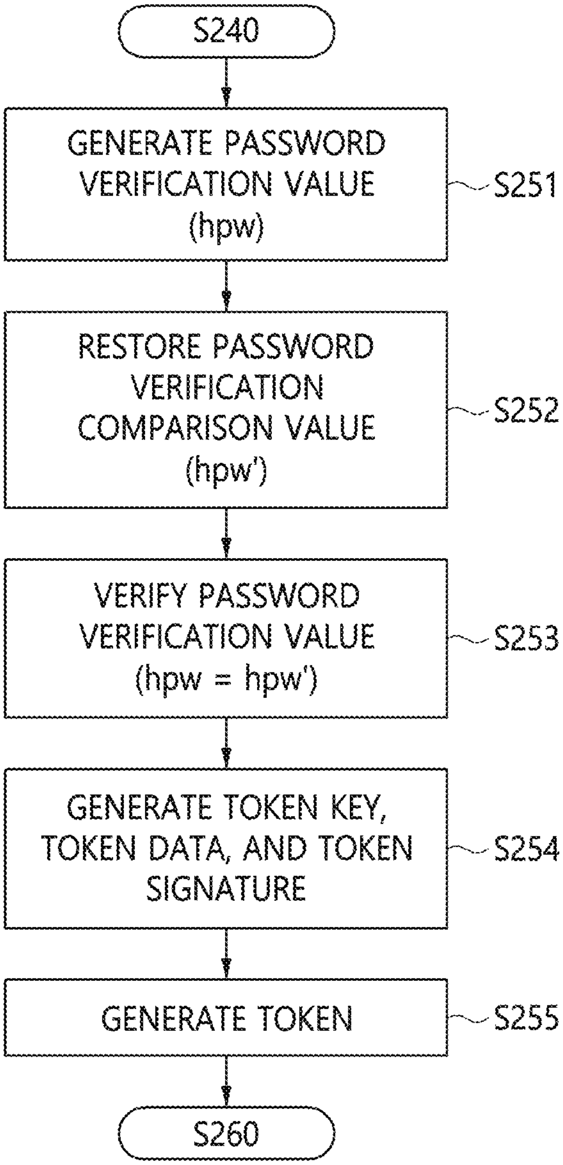
FIG. 5 is a flowchart for explaining a multi-party computation step for distributed authentication of a password according to an embodiment.

FIG. 4 is a signal flowchart for explaining a process of distributed authentication of a password according to an embodiment, and FIG. 5 is a flowchart for explaining a multi-party computation step for distributed authentication of a password according to an embodiment.

Referring to FIG. 4, when an identifier and a password are input by a user at step S210, a user terminal 10 generates a token generation key at step S220. That is, the user who logs in to the service inputs the user ID and the password, and the user terminal 10 generates a random number for inputting the token generation key $tokKey_0$.

Here, the password and the token generation key $tokKey_0$ are used as the input values of a multi-party computation process at step S250.

Meanwhile, the password verification comparison value to be compared with a password verification value may be restored only when at least t servers 20-1, 20-2, . . . , 20-*t*, among N servers 20-1, 20-2, . . . , 20-N across which password verification fragment values are distributed, participate.

Accordingly, the at least t servers 20-1, 20-2, . . . , 20-*t* each read the password verification fragment values $hpw_1$, $hpw_2$, . . . , $hpw_t$, which are stored when the password is registered in a distributed manner, at steps S230-1, S230-2, . . . , S230-*t* and generate token generation keys $tokKey_1$, $tokKey_2$, . . . , $tokKey_t$, which are random values, at steps S240-1, S240-2, . . . , S240-*t*.

Here, the password verification fragment values $hpw_1$, $hpw_2$, . . . , $hpw_t$ and the token generation keys $tokKey_1$, $tokKey_2$, . . . , $tokKey_t$ may be used as the input values of the multi-party computation process at step S250.

Subsequently, operations for distributed authentication of the input password and token generation may be performed at step S250 through multi-party computation between the user terminal 10 and the t servers 20-1, 20-2, . . . , 20-*t*.

Specifically, referring to FIG. 5, the user terminal 10 converts the password input by the user into a password verification value hpw at step S251 in the same manner as in step S121.

The user terminal 10 and the t servers 20-1, 20-2, . . . , 20-*t* jointly restore the password verification comparison value hpw' at step S252.

Here, the password verification comparison value hpw' is restored by being calculated based on the password verification fragment values $hpw_1$, $hpw_2$, . . . , $hpw_t$ of the at least t servers 20-1, 20-2, . . . , 20-*t*, among the N servers 20-1, 20-2, . . . , 20-N across which the password verification fragment values are distributed, as shown in Equation (2) below:

$$hpw' = \sum\nolimits_{i=1}^{t} (\lambda_i \cdot hpw_i) \quad (2)$$

In Equation (2), $\lambda_i$ denotes Lagrange basis polynomials, and may be defined as Equation (3) below:

$$\lambda_i = \prod\nolimits_{j \in \{1,2,\dots,t\} \setminus \{i\}} \frac{j}{j-i} \quad (3)$$

Subsequently, the user terminal 10 and the t servers 20-1, 20-2, . . . , 20-*t*, which participate in user authentication, check whether the restored password verification comparison value hpw' matches the password verification value hpw at step S253.

Here, when the password verification comparison value hpw' matches the password verification value hpw, it may be determined that user authentication succeeds. Conversely, when the password verification comparison value hpw' does not match the password verification value hpw, the user login is terminated with user authentication failure due to the password mismatch.

When it is determined at step S253 that user authentication succeeds, the user terminal 10 and the t servers 20-1, 20-2, . . . , 20-*t*, which participate in user authentication, jointly generate a token key tokKey and a token tokken at step S254.

Here, the token may be configured with token data tokData and a token signature tokSig.

The token data is a set of pieces of data predefined by a service provider, and may include at least one of a user ID, a token serial number, service access authority information, a token issuance date and time, or a token expiration date and time, or a combination thereof.

The token signature may be defined based on various hash or digital signature algorithms. According to an embodiment, HMAC-SHA256, which is one of hash algorithms commonly used in JSON Web Token (JWT), may be used.

Here, Hash-based Message Authentication Code (HMAC) is a cryptographic algorithm for calculating a hash value of a given message using a secret key. Therefore, in order to calculate the token signature using HMAC-SHA256, a secret key is required, and, in an embodiment, the secret key is defined as the token key.

According to an embodiment, the token key tokKey may be calculated using the token generation keys, which are initially generated by the user terminal 10 and the t servers 20-1, 20-2, . . . , 20-*t* at steps S220, S240-1, S240-2, . . . , S240-*t*, as shown in Equation (4) below:

$$tokKey = \sum_{i=0}^{t} tokKey_i \tag{4}$$

Here, because the token key is calculated through the multi-party computation process, each of the servers 20-1, 20-2, . . . , 20-*t* is not able to obtain information about the token generation key input by the other servers.

Also, the token signature tokSig may be calculated using the HMAC algorithm by receiving the token data as a message and receiving the token key as the secret key, as shown in Equation (5) below:

$$tokSig = HMAC(tokKey, tokData) \tag{5}$$

Finally, the token may be generated as tokken={tokData, tokSig} at step S255.

Referring again to FIG. 4, the user terminal 10 receives the token tokken as the result of the multi-party computation process and stores the same at step S260, and all of the servers 20-1, 20-2, . . . , 20-*t* that participate in distributed authentication of the password receive the same token key tokKey and store the same at steps S270-1, S270-2, . . . , S270-*t*.

Here, by the multi-party computation process, the user terminal 10 cannot find out information about the token key obtained by each of the servers 20-1, 20-2, . . . , 20-*t*, and the servers 20-1, 20-2, . . . , 20-*t* also cannot find out the token value given to the user terminal 10.

Figure 6:
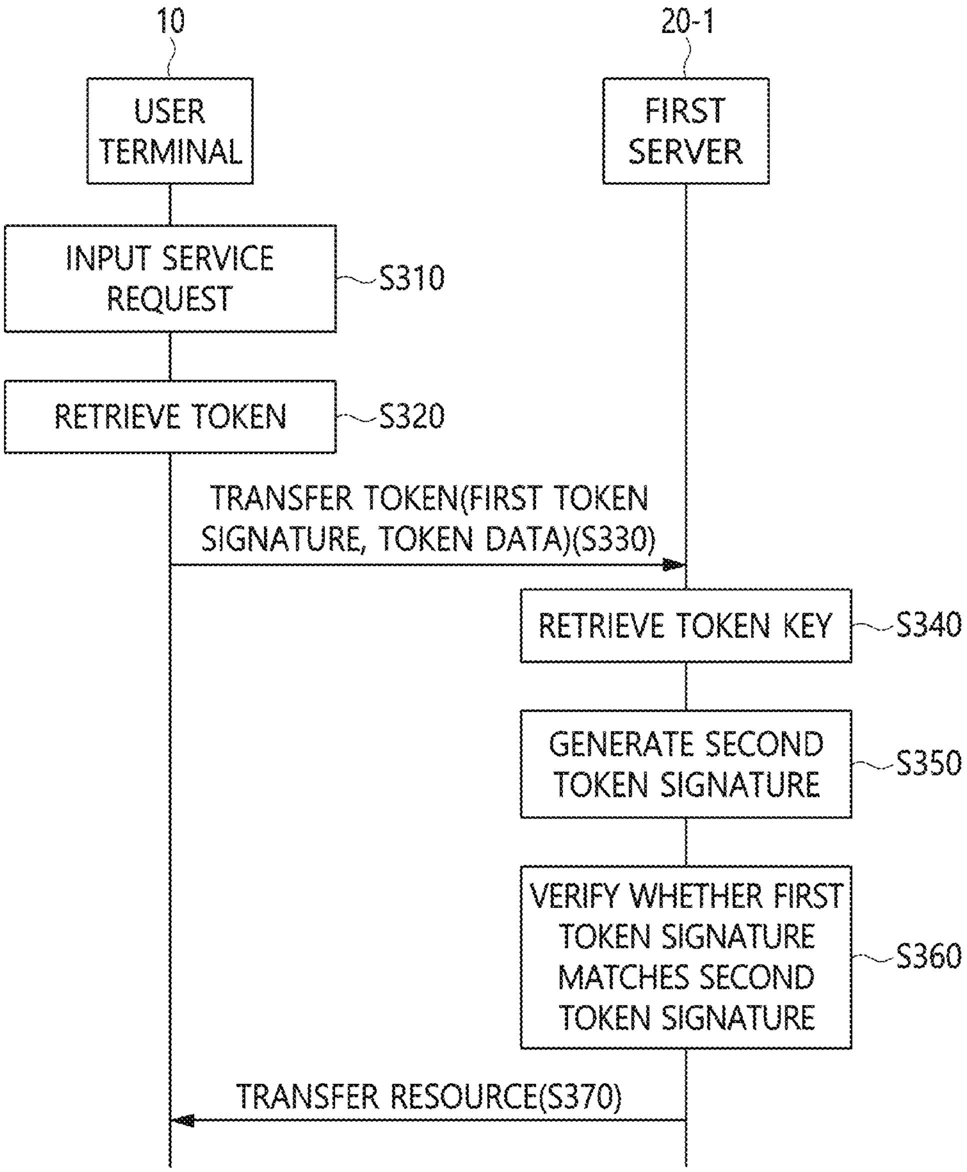
FIG. 6 is a signal flowchart for explaining a process of providing a service based on token verification according to an embodiment.

FIG. 6 is a signal flowchart for explaining a process of providing a service based on token verification according to an embodiment.

Referring to FIG. 6, it is assumed that a first server 20-1 already has a token key for a token issued to a user terminal 10 as a result of participation in a distributed password authentication procedure of the user terminal 10 and has the resource that a user wants to receive through the user terminal 10.

When a service request is input by the user at step S310, the user terminal 10 retrieves whether the token for the requested service is present at step S320.

Here, when the token is not present, the token may be provided through the password-based distributed authentication procedure (S200, FIG. 4 and FIG. 5), and when a password is not registered, the password may be registered in a distributed manner through the distributed password registration procedure (S100, FIG. 2 and FIG. 3).

The user terminal 10 transfers the token to the first server 20-1, which is a server for providing the service, at step S330.

The first server 20-1 retrieves the token key corresponding to the token using some entries (e.g., a token serial number) included in the token received from the user terminal 10 at step S340.

Here, the token may include token data and a first token signature (tokken={tokData, tokSig}).

Subsequently, the first server 20-1 calculates a second token signature tokSig' using the corresponding token key tokKey and the token data tokData included in the token at step S350, as shown in Equation (6) below:

$$tokSig' = HMAC(tokKey, tokData) \tag{6}$$

The first server 20-1 checks whether the generated second token signature tokSig' matches the first token signature included in the token (tokSig∈tokken) at step S360.

Here, when the first token signature does not match the second token signature, the token verification process is stopped.

Conversely, when the first token signature matches the second token signature, this indicates that the user terminal 10 provides a valid token and that the user terminal 10 is qualified to receive the resource for the service.

Accordingly, the first server 20-1 transfers the resource requested by the user terminal 10 at step S370.

Figure 7:
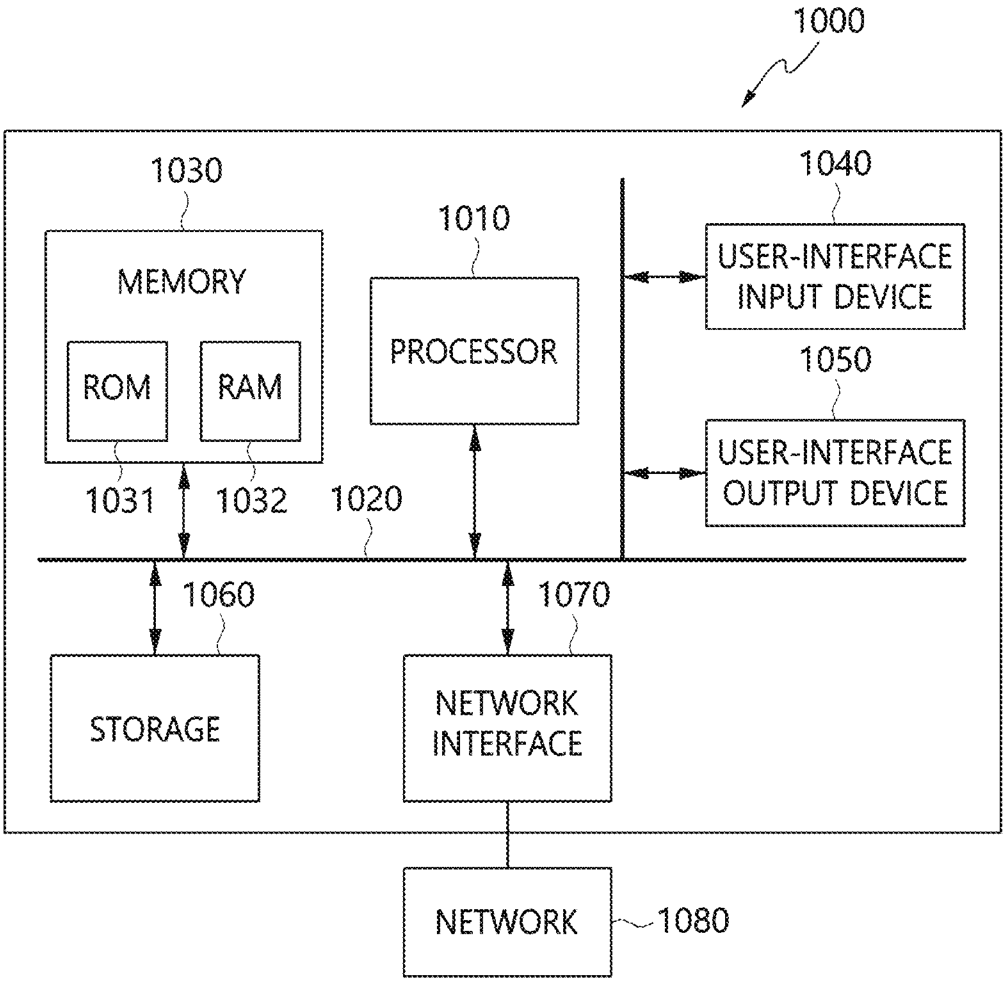
FIG. 7 is a view illustrating a computer system configuration according to an embodiment.

FIG. 7 is a view illustrating a computer system configuration according to an embodiment.

The user terminal 10 and the servers 20-1, 20-2, . . . , 20-N according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, a password verification value may be randomized in a cryptological manner and securely registered in respective servers in a distributed manner.

According to the disclosed embodiment, when a password verification value is restored using password verification fragment values stored in a distributed manner, user authentication may be performed without exposing the original password verification fragment values by performing multi-party computation.

According to the disclosed embodiment, trusted operation and token issuance may be performed between participants (a user terminal and multiple servers), so a trusted third-party organization (a trusted server) for issuing and managing tokens is not required.

According to the disclosed embodiment, it becomes easy to apply the means of user authentication using various credentials capable of being digitally expressed, such as biometric information including fingerprints, an iris, etc., in addition to passwords.

Although the embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for password-based distributed authentication, the apparatus comprising:

memory storing one or more instructions; and a processor configured to execute the one or more instructions to register a password input by a user in a service membership sign-up procedure in multiple servers in a distributed manner based on multi-party computation, wherein, when authenticating the password, the processor is further configured to execute the one or more instructions to:

generate a token generation key when an identifier and the password are input by the user, convert the password input by the user into a password verification value, restore a password verification comparison value, check whether the restored password verification comparison value matches the password verification value, generate a token key and a token based on the token generation key when the password verification comparison value matches the password verification value, and store the generated token.

2. The apparatus of claim 1, wherein when restoring the password verification comparison value, the processor is further configured to execute the one or more instructions to restore the password verification comparison value based on password verification fragment values of t servers, among N servers across which the password verification fragment values are distributed, and the password verification comparison value is calculated as a sum of Lagrange basis polynomials multiplied by the respective password verification fragment values.

3. The apparatus of claim 1, wherein the token includes a token signature and token data.

4. The apparatus of claim 3, wherein the token data includes at least one of a user ID, a token serial number, service access authority information, a token issuance date and time, or a token expiration date and time, or a combination thereof.

5. The apparatus of claim 1, wherein the token key is generated based on a sum of token generation keys initially generated by a user terminal and t servers.

6. The apparatus of claim 1, wherein the processor is further configured to execute the one or more instructions to acquire a resource of a service requested from an authenticated user, by performing retrieving whether a token for the requested service is present, transferring the retrieved token to a server providing the requested service, and receiving the resource from the server providing the requested service when the token is verified.

7. An apparatus for password-based distributed authentication, the apparatus comprising:

memory storing one or more instructions; and a processor configured to execute the one or more instructions to:

authenticate a password input by a user in a login procedure based on multi-party computation using password verification fragment values registered in one or more additional servers in a distributed manner, when authenticating the password, the processor is further configured to execute the one or more instructions to:

read the password verification fragment values corresponding to an identifier of the user and generating a token generation key, convert the password input by the user into a password verification value, restore a password verification comparison value from the password verification fragment values registered in the distributed manner through the multi-party computation with the one or more additional servers, check whether the restored password verification comparison value matches the password verification value, generate a token key and a token based on the token generation key when the password verification comparison value matches the password verification value, and store the generated token key.

8. The apparatus of claim 7, wherein the token key is generated based on a sum of token generation keys initially generated by a user terminal and a t number of servers.

9. The apparatus of claim 7, wherein the processor is further configured to execute the one or more instructions to provide a resource of a service requested from a user terminal based on token verification, and when providing the resource, the processor is further configured to execute the one or more instructions to:

receive a service request and a token from the user terminal, retrieve the token key corresponding to the token, verify the token using the retrieved token key, and provide the resource when the token is verified.

10. The apparatus of claim 9, wherein, when verifying the token, the processor is further configured to execute the one or more instructions to:

generate a token signature using the retrieved token key and token data included in the token, and check whether the generated token signature matches a token signature included in the token.

* * * * *